United States Patent
Mookerjee et al.

(10) Patent No.: US 7,180,443 B1
(45) Date of Patent: Feb. 20, 2007

(54) REDUCED STATE ESTIMATOR FOR SYSTEMS WITH PHYSICALLY BOUNDED PARAMETERS

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 11/081,192

(22) Filed: Mar. 16, 2005

(51) Int. Cl.
*G01S 7/285* (2006.01)

(52) U.S. Cl. ..................... 342/195; 342/162

(58) Field of Classification Search ............. 342/195, 342/192, 90, 95–97, 160–162
See application file for complete search history.

(56) References Cited

U.S. PATENT DOCUMENTS

| | | | |
|---|---|---|---|
| 4,179,696 A * | 12/1979 | Quesinberry et al. | 342/75 |
| 4,791,573 A * | 12/1988 | Zemany et al. | 701/221 |
| 5,432,816 A * | 7/1995 | Gozzo | 375/232 |
| 6,285,971 B1 * | 9/2001 | Shah et al. | 703/2 |
| 7,009,554 B1 * | 3/2006 | Mookerjee et al. | 342/195 |
| 2003/0115232 A1 * | 6/2003 | Lipp | 708/300 |
| 2004/0223480 A1 * | 11/2004 | Nguyen et al. | 370/342 |
| 2005/0100082 A1 * | 5/2005 | Ma | 375/148 |
| 2005/0128138 A1 * | 6/2005 | McCabe et al. | 342/195 |
| 2005/0179580 A1 * | 8/2005 | Cong et al. | 342/70 |

FOREIGN PATENT DOCUMENTS

| | | |
|---|---|---|
| JP | 03195989 A * | 8/1991 |
| JP | 04326083 A * | 11/1992 |

OTHER PUBLICATIONS

"Target tracking algorithms for phased array radar", Wilkin, D.J.; Harrison, I.; Woolfson, M.S. Radar and Signal Processing, IEE Proceedings F vol. 138, Issue 3, Jun. 1991 pp. 255-262.*

(Continued)

*Primary Examiner*—John B. Sotomayor
(74) *Attorney, Agent, or Firm*—Duane Morris, LLP

(57) ABSTRACT

State estimation of a system having multidimensional parameters, which are unknown, arbitrarily time-varying, but bounded, in addition to state variables, is performed by initializing the state estimate and matrices representing its covariance and bias coefficients which linearly relate initial state estimation errors to the parameter errors. System matrices $\Phi$, $\Gamma$, $F$, $G$ and the mean value $\bar{\lambda}$ of unknown, time-varying, but bounded parameters $\lambda$ are determined. A matrix $\Lambda$ is generated, representing their physical bounds. The state estimate $\hat{x}(k|k)$ and matrices $M(k|k)$ and $D(k|k)$, characterizing the effects of measurement errors and parameter uncertainty, are extrapolated to generate $\hat{x}(k+1|k)$, $M(k+1|k)$, and $D(k+1|k)$. The measurement noise covariance $N$ is determined. The filter gain matrix $K$ is calculated. The state estimate is updated with the filter gain matrix $K$ weighting the measurement $z(k+1)$ and the extrapolated state estimate $\hat{x}(k+1|k)$ to generate the current system estimate $\hat{x}(k+1|k+1)$, by minimizing its total mean square error due to measurement errors and parameter uncertainty. The matrices $M(k+1|k)$ and $D(k+1|k)$ are updated with the filter gain matrix $K$ to generate $M(k+1|k+1)$ and $D(k+1|k+1)$.

2 Claims, 3 Drawing Sheets

OTHER PUBLICATIONS

"Target tracking based on Kalman-type filters combined with recursive estimation of model disturbances", Nordsjo, A.E. Radar Conference, 2005 IEEE International May 9-12, 2005 Ps:115-120.*

"Adaptive detection threshold optimization for tracking in clutter", Gelfand, S.B.; Fortmann, T.E.; Bar-Shalom, Y. Aerospace and Electronic Systems, IEEE Transactions on vol. 32, Issue 2, Apr. 1996 Ps:514-523.*

"Improved particle filters for ballistic target tracking", Bruno, M.G.S.; Pavlov, A. Acoustics, Speech, and Signal Processing, 2004. Proceedings. (ICASSP '04). IEEE Int'l Conference on vol. 2, May 17-21, 2004 Ps: ii—705-8.*

* cited by examiner

REDUCED STATE ESTIMATOR FOR SYSTEMS WITH PHYSICALLY BOUNDED PARAMETERS

FIELD OF THE INVENTION

The invention relates generally to state estimation after processing measurements of systems characterized by measurement errors and multidimensional parameters, for which the latter are unknown but may vary arbitrarily in time within physical bounds. In a particular aspect, the invention relates to the tracking of moving targets using estimation, which takes into consideration measurement errors and physical bounds or limits on parameters of the target track.

BACKGROUND OF THE INVENTION

Figure 1:
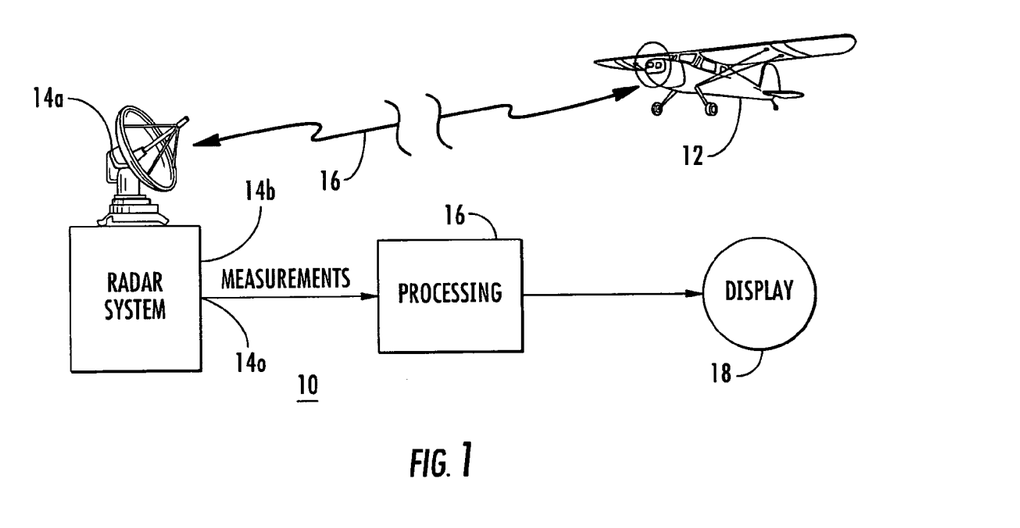
FIG. 1 is a simplified block diagram of a system for estimating the state of a target, which in this case is the track of an aircraft.

FIG. 1 represents a simplified target tracking system 10. System 10 tracks a target, illustrated as being an aircraft 12, by the use of a radar system 14. Radar system 14 includes a radar antenna 14a, which transmits and receives radar signals illustrated by "lightning bolt" symbols 16. Portions of the transmitted signals 16 are reflected by target 12 and return to the radar antenna 14a. The returned signals allow the generation of measurements at an output port 14o of radar system 14. These measurements include values of at least target position, possibly in the form of range and angles from the radar system 14. The measurements are applied to a processing arrangement 16, which determines from the measurements various target parameters, which may include course (direction of motion), speed, and target type. The estimated position of the target, and possibly other information, is provided to a utilization apparatus or user, illustrated in this case as being a radar display 18. The operator (or possibly automated decision making equipment) can make decisions as to actions to be taken in response to the displayed information. It should be understood that the radar tracking system 10 of FIG. 1 is only one embodiment of a general class of estimation systems which may include controlling nuclear, chemical, or manufacturing factories or facilities, control processes subject to external parameter changes, attitude control of a space station subject to vibrations, traction control of an automobile subject to weather conditions, and the like.

Consider the problem of tracking an airplane whose trajectory in three dimensions is an arbitrary curve with bounded instantaneous turn rate and tangential acceleration. The parameters of this tracking problem are the turn rate $\omega$ (which can be related to the curvature of the trajectory) and the tangential acceleration $\alpha$. These parameters, $\omega$ and $\alpha$, are neither exclusively constant nor strictly white noise stochastic processes, but vary arbitrarily in time within physical bounds. Time dependent, but bounded, parameters $\omega$ and $\alpha$ typically represent a maneuvering target as described in Y. Bar-Shalom, X. R. Li, and T. Kirubarajan, *Estimation with Applications to Tracking and Navigation: Theory, Algorithms, and Software*, New York, N.Y.: John Wiley & Sons, Inc., 2001, and in X. R. Li and V. P. Jilkov, "A Survey of Maneuvering Target Tracking—Part IV: Decision-Based Methods," *Proceedings of SPIE* Vol. 4728 (2002), pp. 511–534.

This problem belongs to a more general problem of estimating the state of a system that depends on time dependent parameters with unknown values but with known bounds. In some situations, the Kalman filter solves this problem by including the parameters as part of an augmented state to be estimated, as described in C. Bembenek, T. A. Chmielewski, Jr., and P. R. Kalata, "Observability Conditions for Biased Linear Time Invariant Systems," *Proceedings of the American Control Conference*, pp. 1180–1184, Philadelphia, Pa., June 1998, B. Friedland, "Treatment of Bias in Recursive Filtering," *IEEE Transactions on Automatic Control*, pp. 359–367, Vol. AC-14, No. 4, August 1969, and D. Haessig and B. Friedland, "Separate-Bias Estimation with Reduced-Order Kalman Filters," *IEEE Transactions on Automatic Control*, pp. 983–987, Vol. 43, No. 7, July 1998. Such a filter will be called a "full state" estimator. However, the parameters may vary too erratically to be considered as observables, as noted by G. J. Portmann, J. R. Moore, and W. G. Bath, "Separated Covariance Filtering," *Record of the IEEE* 1990 *International Radar Conference*, 1990, pp. 456–460, or there may be too many parameters to estimate. In the case in which parameters cannot be estimated, filters, which do not augment the state vector with these parameters, often give better performance. Such a filter will be called a "reduced state" estimator. More generally, a "reduced state" or "reduced order" estimator uses fewer states than would be required to completely specify the dynamics.

The concept of "full state estimation" is fundamentally different from that of "reduced state estimation." In the full state estimation context, the state estimation technique attempts to learn the unknown parameters (such turn rate $\omega$ and tangential acceleration $\alpha$ in the above mentioned airplane example). In the reduced state estimator, the estimator is not designed to perform any learning at all. In the airplane example, the bounded parameters $\omega$ and $\alpha$ are expected to change during the learning process, so that, at any given time, a learned parameter, such as $\omega$ or $\alpha$, is likely to bear no relation to the actual parameter at that time.

According to Portmann, Moore, and Bath (supra), a full state estimator assumes "that accelerations last long enough and are constant enough to be observed and estimated." Li and Jilkov (supra) observe that a full state estimator "suffers from two major deficiencies, which stem from assuming constant input and known onset time." Except in the case of target maneuvers, target trajectories are very predictable. Since the onset time of a maneuver is not known, maneuvers are difficult to model as stochastic processes. For this reason, full state estimators are rarely used to track maneuvering targets. Kalman filters with white plant noise are currently used as reduced state estimators. Such Kalman filters are not necessarily optimal. Portmann, Moore and Bath could not solve the problem beyond a single parameter in a one-dimensional tracking scenario. They state in their article that their filter "can be modified in a straightforward manner to permit operation in two or three coupled dimensions" and that "The major differences" in one dimension versus multiple dimensions "lie in the special treatment of the cross-gain terms when computing the lags and in the form of the minimization process." However, their method cannot be generalized beyond one dimension, and no such solution was ever published by them or by anyone else. In particular, their use of absolute values and signs of their single parameter cannot be generalized (see equations (20) and (21) in G. J. Portmann, J. R. Moore, and W. G. Bath, "Separated Covariance Filtering," *Record of the IEEE* 1990 *International Radar Conference*, 1990, pp. 456–460).

Bar-Shalom, Blair, Li, Moore, and Kirubarajan (supra) define a track filter to be consistent if the state errors and innovations (i.e., measurement residuals) satisfy the tenets of Kalman filter theory, namely that the state estimation and innovation covariances correctly characterize the actual errors, and that the innovations are a white stochastic process as additionally set forth in W. D. Blair and Y. Bar-Shalom, "Tracking Maneuvering Targets with Multiple Sensors: Does More Data Always Mean Better Estimates?" *IEEE Transactions on Aerospace and Electronic Systems*, pp. 450–456, Vol. AES-32, No. 1, January 1996 and J. R. Moore and W. D. Blair, "Practical Aspects of Multisensor Tracking," in *Multitarget-Multisensor Tracking: Applications and Advances*, Volume III, Y. Bar-Shalom and William Dale Blair, (ed.) Boston, Mass.: Artech House, 2000, pp. 43–44. Specifically, these three conditions for Kalman filter consistency are as follows:

(a) "The state errors should be acceptable as zero mean and have magnitude commensurate with the state covariance as yielded by the filter."
(b) "The innovations should also have the same property."
(c) "The innovations should be acceptable as white."

Note that a reduced state estimator can only satisfy the first two of these conditions for consistency, since the innovations of a reduced state estimator, unlike a full state estimator, are generally not a white stochastic process. Thus, we define a reduced state estimator to be consistent if the state estimation and innovation covariances correctly characterize the actual errors. That is, a reduced state estimator is consistent if conditions (a) and (b) above are satisfied.

Another definition of filter consistency from Bar-Shalom, Li, and Kirubarajan is that "A state estimator is consistent if the first and second order moments of its estimation errors are as the theory predicts." This definition also applies to reduced state estimators, and is satisfied if the RMS state estimation errors lie within the one-sigma error ellipsoid of the state covariance as calculated by the filter. As stated by Bar-Shalom, Li, and Kirubarajan, "Since the filter gain is based on the filter-calculated error covariances, it follows that consistency is necessary for filter optimality: Wrong covariances yield wrong gain. That is why consistency evaluation is vital for verifying a filter design—it amounts to evaluation of estimator optimality."

Consequences of filter inconsistency for tracking of maneuvering targets may be:
(a) Estimated trajectories deviate substantially from the true trajectory during maneuvers;
(b) Covariance matrices produced by the filter do not characterize the actual errors, and hence decision processes that rely on these covariances are subject to unwanted erroneous or false decisions; and
(c) Multisensor tracking yields worse errors than single-sensor tracking.

It has been shown in P. Mookerjee and F. Reifler, "Optimal Reduced State Estimators for Consistently Tracking Maneuvers," *IEEE Transactions on Aerospace and Electronic Systems* (in press), that the inconsistency causing these adverse consequences can be resolved using the optimal reduced estimator derived by P. Mookerjee and F. Reifler in "Reduced State Estimator for Systems with Parametric Inputs," *IEEE Transactions on Aerospace and Electronic Systems*, pp. 446–461, Vol. AES-40, No. 2, April 2004.

According to Moore and Blair (supra), "Track filter consistency is critical for effective fusion of data from multiple sensors with diverse accuracies. Maneuvering targets pose a particularly difficult challenge to achieving track filter consistency." Blair and Bar-Shalom (supra) have shown an example where a Kalman filter used as an inconsistent reduced state estimator paradoxically yields worse errors with multisensor tracking than with single sensor tracking.

Note that when a filter is used to support a decision process, such as collision avoidance or detection-to-track correlation, the measure of performance is the frequency of false decisions. As stated by Portmann, Moore, and Bath (supra), "At any decision point in time (not necessarily at the time of a measurement), one needs both the best available estimate of object state and a firm confidence interval for this state that allows one to say with specified probability that the object state is in some region about the estimate regardless of whether it is accelerating and regardless of how long it has been accelerating. The confidence interval should be valid for an extreme target acceleration sequence which is based on what is known about target dynamics."

As a reduced state estimator, the Kalman filter suffers from several difficulties in addition to its inconsistency for supporting decisions as discussed in the above mentioned Portmann, Moore, and Bath references, and in P. Mookerjee and F. Reifler, "Application of Reduced State Estimation to Multisensor Fusion with Out-of-Sequence Measurements," *Proceedings of the 2004 IEEE Radar Conference*, Philadelphia, Pa., Apr. 26–29, 2004, pp. 111–116.

Figure 2:
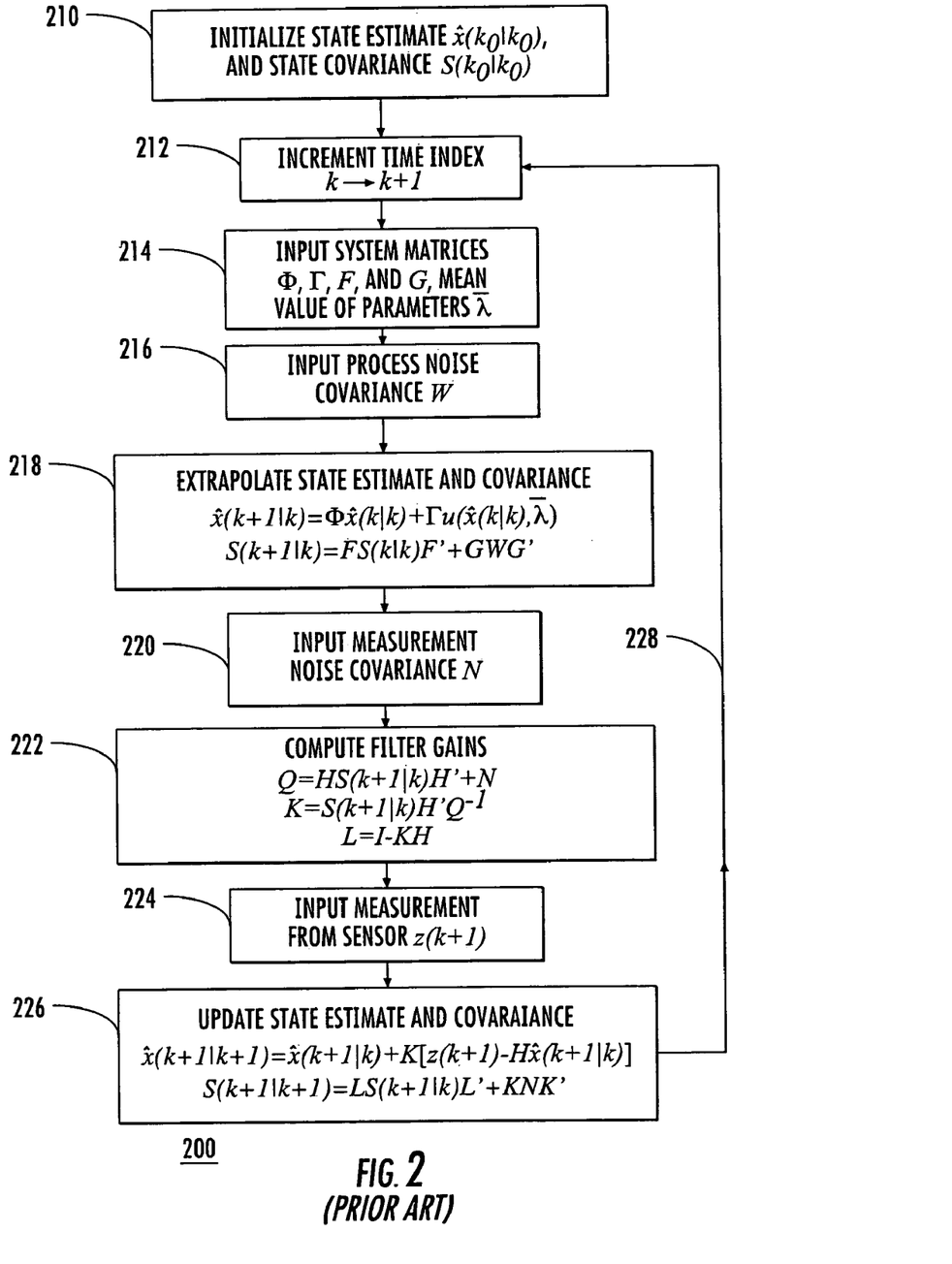
FIG. 2 is a simplified logic flow chart or diagram illustrating the processing in a prior-art reduced-state Kalman filter portion of the arrangement of FIG. 1.

FIG. 2 is a simplified logic flow chart or diagram 200 illustrating a reduced-state Kalman filter such as may be found in the prior art. A similar illustration is available in the textbook Y. Bar-Shalom, X. Rong Li, and T. Kirubarajan (2001), *Estimation with Applications to Tracking and Navigation: Theory Algorithms and Software*, John Wiley & Sons, Inc. New York. FIG. 2 applies the reduced state Kalman filter to the problem of estimating the state of a system described by $$x(k+1)=\Phi x(k)+\Gamma u(x(k),\lambda) \qquad (1)$$

where $x(k)$ is the state vector at the $k^{th}$ sample time $t_k$ for $k=0, 1, 2, \ldots$, and $u(x(k),\lambda)$ is a system input that is a function of the state vector $x(k)$ and arbitrarily unknown time-varying parameters $\lambda$ with known bounds. This input function $u(x(k),\lambda)$ may be nonlinear or linear. Here the matrices $\Phi$ and $\Gamma$ are the system transition and input matrices at time $t_k$. In general, these system matrices represent the relationship between the current state and the previous state of the system. The parameters $\lambda$ are neither constant nor stochastic processes. These parameters have a known mean value $\bar{\lambda}$. (This general class of systems is of type (c) or (e) discussed below in paragraph 0037.) A limitation of the Kalman filter is that only the mean value $\bar{\lambda}$ can be used in the reduced state Kalman filter and not their physical bounds. The Kalman filter's only recourse to addressing the physical bounds on the parameters $\lambda$ is to use an empirically determined white noise covariance W that does not accurately model the physical bounds in the prior art. A sensor (or sensors) measures aspects of the system's state. In the target tracking example, the state of the system might be target position and velocity and a measured aspect of the state might be position alone. Measurements $z(k)$ are collected according to $$z(k)=Hx(k)+n(k) \qquad (2)$$

where at time $t_k$, the matrix H is the measurement matrix and $n(k)$ is the $k^{th}$ sample of the measurement noise, whose covariance matrix is N.

In FIG. 2, the logic of the prior art Kalman filter begins with a block 210, which initializes the state estimate $\hat{x}(k_0|k_0)$ and the state covariance $S(k_0|k_0)$, where $k_0=0, 1, 2, \ldots$ measurements are used for initialization at time $t_{k_0}$. In general, the notations $\hat{x}(j|k)$ and $S(j|k)$ will denote the state estimate and its covariance at time t for $j=1, 2, \ldots$ based on processing k measurements at times $t_1, t_2, \ldots, t_k$. From block 210, the logic of the prior art Kalman filter of FIG. 2 flows to a block 212, which represents the incrementing of a time index from k to k+1.

Block 214 of the prior art Kalman filter represents the accessing or inputting of system transition matrices $\Phi$, $\Gamma$, F, and G, where $$F = \Phi + \Gamma \frac{\partial u}{\partial x}\bigg|_{x=\hat{x}(k|k), \lambda=\bar{\lambda}} \quad (3)$$

$$G = \Gamma \frac{\partial u}{\partial \lambda}\bigg|_{x=\hat{x}(k|k), \lambda=\bar{\lambda}} \quad (4)$$

From block 214, the logic of the prior art Kalman filter of FIG. 2 flows to a block 216, which represents the accessing or inputting of the white process noise covariance W. The white process noise covariance W is determined in an empirical way in the prior art.

From block 216, the logic of the prior art Kalman filter of FIG. 2 proceeds to a block 218, which represents the extrapolation of state estimate and covariance. The extrapolated state is $$\hat{x}(k+1|k) = \Phi \hat{x}(k|k) + \Gamma u(\hat{x}(k|k), \lambda) \quad (5)$$

and its covariance is $$S(k+1|k) = FS(k|k)F' + GWG' \quad (6)$$

From block 218, the logic of the prior art Kalman filter of FIG. 2 flows to a block 220, which represents the accessing or inputting of the measurement noise covariance N. Block 222 represents the computation of the filter gain matrix K. The covariance, Q, of the residual is calculated as $$Q = HS(k+1|k)H' + N \quad (7)$$

The filter gain matrix K is calculated as $$K = S(k+1|k)H'Q^{-1} \quad (8)$$

and the matrix L is calculated as $$L = I - KH \quad (9)$$

where I is the identity matrix.

From block 222 of FIG. 2, the logic of the prior art Kalman filter flows to a block 224, which represents the accessing or inputting of sensor measurements z(k+1). Finally, block 226 of FIG. 2 represents updating the state estimate and its covariance given by $$\hat{x}(k+1|k+1) = \hat{x}(k+1|k) + K[z(k+1) - H\hat{x}(k+1|k)] \quad (10)$$

$$S(k+1|k+1) = LS(k+1|k)L' + KNK' \quad (11)$$

Prior art (Kalman filter) uses the white process noise covariance W in (6) and obtains the optimal gain matrix K that minimizes the updated state covariance $S(k+1|k+1)$ in (11).

Improved or alternative state estimation is desired.

SUMMARY OF THE INVENTION

In general, the invention relates to state estimation of a system having multidimensional parameters, which are unknown, time-varying, but bounded, in addition to and distinguished from state variables. The method comprises the steps of:

(a) Initializing a filter with an initial state estimate $\hat{x}(k_0|k_0)$ and matrices $M(k_0|k_0)$, $D(k_0|k_0)$ associated with the initial state covariance. In general, the matrix $M(j|k)$ is defined as the covariance of the state estimation errors at time $t_j$ due only to the errors in the measurements $z(i)$ for $1 \leq i \leq k$ and a priori initial information that is independent of the parameter uncertainty. $D(j|k)$ is defined as the matrix of bias coefficients, which linearly relates state estimation errors to the parameter errors, at time $t_j$ (after processing $k=0, 1, 2, \ldots$ measurements). The use of the matrices $M(j|k)$, and $D(j|k)$ instead of $S(j|k)$ is a difference in the current invention from the prior art.

(b) Determining system matrices $\Phi$, $\Gamma$, F, G and the mean value $\bar{\lambda}$ of unknown but bounded parameters $\lambda$.

(c) Generating a parameter matrix $\Lambda$ representing physical bounds on those parameters that are not state variables of the system. This is a departure from the prior art, which uses a white process noise covariance, W, that does not correctly model the class of systems addressed by the current invention.

(d) Extrapolating the state estimates $\hat{x}(k|k)$ to $\hat{x}(k+1|k)$; and extrapolating the matrices $M(k|k)$ and $D(k|k)$, associated with the state covariance, to $M(k+1|k)$ and $D(k+1|k)$ and combining them with the parameter matrix $\Lambda'$ to obtain the extrapolated total covariance $S(k+1|k)$.

(e) Determining the measurement noise covariance N and calculating the filter gain matrix K. The state estimate is updated with the filter gain matrix K weighting the measurement $z(k+1)$ of aspects of the state of the system and the extrapolated state estimate $\hat{x}(k+1|k)$ to generate the current system estimate $\hat{x}(k+1|k+1)$. The matrices $M(k+1|k)$ and $D(k+1|k)$, are updated with the filter gain matrix K to obtain $M(k+1|k+1)$ and $D(k+1|k+1)$ and to generate its total mean square error $S(k+1|k+1)$ due to measurement errors and parameter uncertainty.

A method according to an aspect of the invention is for estimating the state of a system having multidimensional parameters in addition to state variables, which parameters are unknown, arbitrarily time-varying, except for known bounded values. For example, the turn rate and tangential acceleration of an aircraft are multidimensional arbitrarily time-varying parameters that have known bounds, in addition to the state of the aircraft given by its position and velocity. The state estimates are used to make decisions or to operate a control system or to control a process.

A method according to another aspect of the invention comprises the steps of observing a system having multidimensional parameters in addition to state variables, measuring aspects of its state in the presence of measurement errors to produce measurements. These measurements are applied to an estimating filter to produce estimates of the true states that cannot be otherwise discerned by an observer. These estimates are used to make decisions or to operate a control system or to control a process.

A method according to another aspect of the invention applies the measurements to an estimating filter that explicitly uses a mean square optimization criterion taking into account measurement errors and maximum excursions of the system parameters to produce estimates of the state of the system. The method then uses these estimates to make decisions or to operate a control system or to control a process.

A method according to another aspect of the invention is for estimating the state of a system having multidimensional parameters, which have known bounded values. The method comprises the steps of measuring aspects of the state of the system to produce measurements, and initializing state estimates $\hat{x}(k_0|k_0)$ and matrices $M(k_0|k_0)$, $D(k_0|k_0)$, where matrix $M(j|k)$ is defined as the covariance of the state estimation errors at time $t_j$ due only to the errors in the measurements $z(i)$ for $1 \leq i \leq k$ and a priori initial information that is independent of the parameter uncertainty, and matrix $D(j|k)$ is defined as the matrix of bias coefficients, which linearly relates state estimation errors to the parameter errors, at time $t_j$ (after processing k=0, 1, 2, ... measurements). Determinations are made of the system matrices $\Phi$ and $\Gamma$, and of the mean value $\bar{\lambda}$ of the unknown but bounded parameters $\lambda$. Matrices F and G are obtained from the system matrices $\Phi$ and $\Gamma$ as follows:

$$F = \Phi + \Gamma \frac{\partial u}{\partial x}\bigg|_{x=\hat{x}(k|k), \lambda=\bar{\lambda}} \quad (12)$$

$$G = \Gamma \frac{\partial u}{\partial \lambda}\bigg|_{x=\hat{x}(k|k), \lambda=\bar{\lambda}} \quad (13)$$

A parameter matrix $\Lambda$ is generated, with $\Lambda$ representing the physical bounds on parameters that are not state variables of the system. The state estimate $\hat{x}(k|k)$ is extrapolated to $\hat{x}(k+1|k)$ as $$\hat{x}(k+1|k) = \Phi \hat{x}(k|k) + \Gamma u(\hat{x}(k|k), \bar{\lambda}) \quad (14)$$

and the matrices $M(k|k)$, $D(k|k)$, and $S(k|k)$ are extrapolated to $M(k+1|k)$, $D(k+1|k)$ and $S(k+1|k)$, respectively, as $$M(k+1|k) = FM(k|k)F' \quad (15)$$

$$D(k+1|k) = FD(k|k) + G \quad (16)$$

$$S(k+1|k) = M(k+1|k) + D(k+1|k)\Lambda D(k+1|k)' \quad (17)$$

The noise covariance N is determined. The covariance of the residual Q is calculated as $$Q = HS(k+1|k)H' + N \quad (18)$$

The filter gain matrix K is calculated as $$K = S(k+1|k)H'Q^{-1} \quad (19)$$

and the matrix L is calculated as $$L = I - KH \quad (20)$$

where I is the identity matrix. At least one aspect $z(k+1)$ of the state of the system is measured. The state estimate $\hat{x}(k+1|k+1)$ is calculated as $$\hat{x}(k+1|k+1) = \hat{x}(k+1|k) + K[z(k+1) - H\hat{x}(k+1|k)] \quad (21)$$

and the matrices $M(k+1|k+1)$ and $D(k+1|k+1)$ are calculated as $$M(k+1|k+1) = LM(k+1|k)L' + KNK' \quad (22)$$

and $$D(k+1|k+1) = LD(k+1|k) \quad (23)$$

respectively. The total state covariance is calculated as $$S(k+1|k+1) = M(k+1|k+1) + D(k+1|k+1)\Lambda D(k+1|k+1)' \quad (24)$$

DESCRIPTION OF THE INVENTION

A key difficulty of designing a Kalman filter is that the white plant noise covariance W (also called process noise covariance), which is selected to cope with the reduced state, must be optimized empirically. Empirical optimization is a difficult task in multisensor applications, as indicated by Mookerjee and Reifler, supra. It should be recognized that white noise cannot be used to "model exactly target maneuvers, which are neither zero-mean nor white—they are not even random," Y. Bar-Shalom and X-R. Li, *Multitarget-Multisensor Tracking: Principles and Techniques*, Storrs, Conn.: YBS Publishing, 1995, p. 26. For example, in tracking applications, the white plant noise covariance W that gives optimal performance depends not only on the parameter matrix $\Lambda$, but also on other variables such as the measurement noise covariance and the data rate. The ratio of W to $\Lambda$ can be more than two orders of magnitude (a ratio of 100:1). Thus in a Kalman filter W has to be empirically adjusted for optimal performance. Optimizing performance by choice of W in an example given by P. S. Maybeck and M. R. Schore, "Reduced-Order Multiple Model Adaptive Controller for Flexible Spacestructure," *IEEE Transactions on Aerospace and Electronic Systems*, pp. 756–767, Vol. 28, No. 3, July 1992, with 6 states in each of the multiple filter models reduced from 24 states in the truth model, would be a daunting empirical task, which is automatically achieved through $\Lambda$ using the invention.

For motion along a one-dimensional axis, Bar-Shalom, Blackman, Blair, Li, and Kirubarajan have suggested as guidelines that $\sqrt{W}$ be selected as a constant equal to 33%, 50%, or 100% of the maximum acceleration Bar-Shalom and Li; Bar-Shalom, Li, and Kirubarajan; and S. Blackman, *Multiple-Target Tracking with Radar Applications* Norwood, Mass.: Artech House, Inc., 1986. However, simple examples by Mookerjee and Reifler show that the optimal $\sqrt{W}$ can be more than an order of magnitude times the maximum acceleration, which is quite different from 33%, 50%, or 100%. In tracking applications, the white plant noise covariance W that gives optimal performance depends not only on the maximum acceleration, but also on other variables such as the measurement noise covariance and the data rate. In multisensor tracking the geometry of the sensors is equally important as the maneuvers. The task of finding an optimal W is especially difficult when measurements come from multiple sensors with different measurement characteristics, and according to Moore and Blair usually requires a great deal of empirical simulation. The optimal reduced estimator according to an aspect of the invention avoids the need for simulation by analytical modeling of the parameter bounds.

Using the physical bounds on the parameters $\omega$ (turn rate) and $\alpha$ (tangential acceleration) in the airplane example above, the optimal reduced state estimator is consistent for a maneuver. Li and Jilkov stated "tracking a maneuvering target assuming it is not maneuvering may have a serious consequence (e.g., track loss), while tracking a non-maneuvering target assuming it is maneuvering usually only suffers minor performance degradation". By explicitly modeling the maximum excursions of ω and α, an optimal reduced state estimator according to an aspect of the invention satisfies this principle enunciated by Li and Jilkov.

In the airplane-tracking example, maximum accelerations produced by the bounds of the parameters ω and α, along the instantaneous normal and tangential airplane axes, bound all physically possible maneuvers. In the filter model of the invention, these maximum accelerations are represented in an equivalent statistical model by a multivariate Gaussian distribution of constant accelerations, whose one-sigma ellipsoid best approximates the maximum accelerations. Among all estimators (including reduced state Kalman filters) with the same reduced states, the optimal reduced state estimator according to an aspect of the invention is defined to have minimal covariance using this filter model. This covariance is the minimal covariance achievable by linearly weighting the predicted states with a new measurement at each successive update of the filter. The optimal reduced state estimator minimizes the mean-square and thereby, the root-mean-square (RMS) estimation errors for the maximum excursions of the parameters in the truth model. Furthermore, since the bounds on the parameters ω and α are included in the covariance that is minimized, the optimal reduced state estimator does not need white plant noise, as is required by Kalman filters, to cope with the reduced state.

Figure 3:
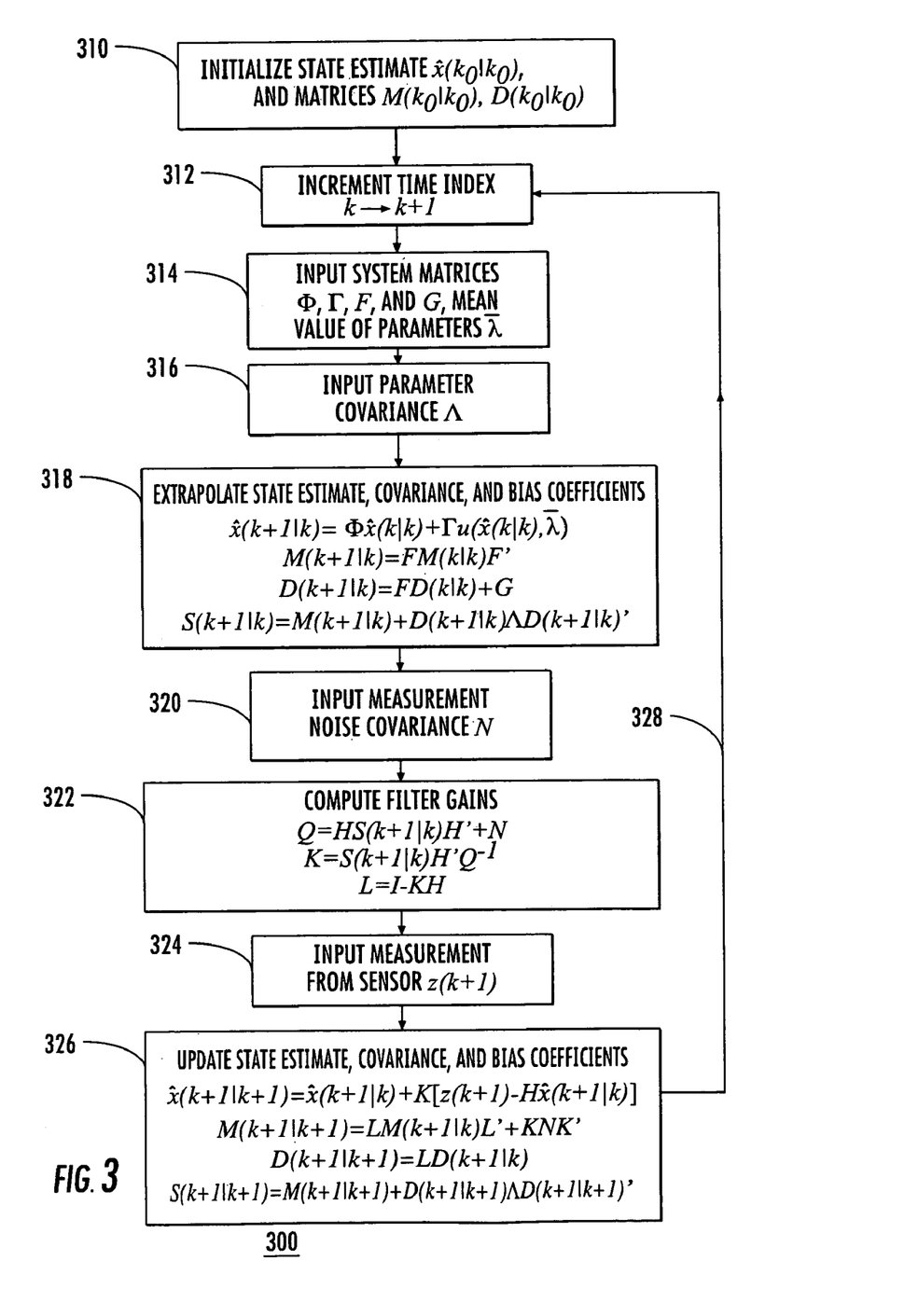
FIG. 3 is a simplified logic flow chart or diagram illustrating the processing associated with a reduced-state estimator according to an aspect of the invention, which may be used in the arrangement of FIG. 1.

The solution of the problem requires a completely different method, which is incorporated in an aspect of the invention. The simplified logic flow chart or diagram 300 of FIG. 3 illustrates a method according to an aspect of the invention. In FIG. 3, the logic flow of the invention begins with initialization of the state estimate $\hat{x}(k_0|k_0)$ and the matrices $M(k_0|k_0)$, $D(k_0|k_0)$. Matrix $M(j|k)$ is defined as the covariance of the state estimation errors at time $t_j$ due only to the errors in the measurements $z(i)$ for $1 \leq i \leq k$ and a priori initial information that is independent of the parameter uncertainty. Matrix $D(j|k)$ is defined as the matrix of bias coefficients, which linearly relates state estimation errors to the parameter errors, at time $t_j$ (after processing k=0, 1, 2, . . . measurements). Thus, the initial information, which is obtained in order to begin processing, is different from that of the prior art, in that matrices $M(j|k)$ and $D(j|k)$ are used instead of state covariance $S(j|k)$. From block 310, the logic of the invention of FIG. 3 flows to a block 312, which represents the incrementing of a time index k to k+1 as in the prior art method. The logic of the invention then flows to a further block 314, which represents the accessing or inputting of the system matrices Φ, Γ, F, and G, where $$F = \Phi + \Gamma \frac{\partial u}{\partial x}\bigg|_{x=\hat{x}(k|k), \lambda=\bar{\lambda}} \quad (25)$$

$$G = \Gamma \frac{\partial u}{\partial \lambda}\bigg|_{x=\hat{x}(k|k), \lambda=\bar{\lambda}} \quad (26)$$

From block 314, the logic of the invention of FIG. 3 flows to a block 316, which accesses or inputs a parameter matrix Λ. The parameter matrix Λ represents the physical bounds on the unknown parameters, such as turn rate and tangential acceleration, and is preferably selected based on a precise description of the physical system, and depends upon well-known physical phenomena and characteristics of real systems. Types of physical parameters, which might be considered for determination of Λ in the case of maneuvers, are the turn rate ω and the tangential acceleration α. This is a departure from the prior art, which uses a white process noise covariance W that does not correctly model the class of systems addressed by the invention herein.

From block 316 of FIG. 3, the logic flow of the invention proceeds to a block 318, which represents the extrapolation of state estimates $\hat{x}(k|k)$, and matrices $M(k|k)$, $D(k|k)$ according to $$\hat{x}(k+1|k) = \Phi\hat{x}(k|k) + \Gamma u(\hat{x}(k|k), \bar{\lambda}) \quad (27)$$

$$M(k+1|k) = FM(k|k)F' \quad (28)$$

$$D(k+1|k) = FD(k|k) + G \quad (29)$$

$$S(k+1|k) = M(k+1|k) + D(k+1|k)\Lambda D(k+1|k)' \quad (30)$$

Thus, another difference between the invention herein and the prior art exemplified in FIG. 2 is that the prior art Kalman filter extrapolates state estimate $\hat{x}(k|k)$ and state covariance $S(k|k)$ to $\hat{x}(k+1|k)$ and $S(k+1|k)$, while the current invention extrapolates state estimate $\hat{x}(k|k)$ and matrices $M(k|k), D(k|k)$ to $\hat{x}(k+1|k)$ and $M(k+1|k), D(k+1|k)$ respectively.

From block 318 of FIG. 3, the logic of the invention flows to a block 320, which represents the accessing or inputting of the measurement noise covariance N, as in block 220 of FIG. 2. Block 322 of FIG. 3 corresponds to block 222 of FIG. 2, in that it represents the computation as in the prior art of the filter gain matrix K, and filter matrices Q, and L. While generically similar to the prior art, the filter gain matrix K obtained in block 322 of the arrangement of FIG. 3 are different from the filter gain matrix K obtained in prior art because of the use of $M(k+1|k), D(k+1|k)$ and Λ to formula $S(k+1|k)$ in equation (30). The covariance of the residual Q is calculated as $$Q = HS(k+1|k)H' + N \quad (31)$$

The filter gain matrix K is calculated as $$K = S(k+1|k)H'Q^{-1} \quad (32)$$

and the matrix L is calculated as $$L = I - KH \quad (33)$$

where I is the identity matrix.

From block 322 of FIG. 3, the logic flows to a further block 324, which represents the measurement z(k+1) of aspects of the state of the system. This step is same as the corresponding step of the prior art.

The logic flows from block 324 of FIG. 3 to a block 326, which represents the updating of the state estimate and the associated matrices. More particularly, the state estimate $\hat{x}(k+1|k+1)$ is calculated as $$\hat{x}(k+1|k+1) = \hat{x}(k+1|k) + K[z(k+1) - H\hat{x}(k+1|k)] \quad (34)$$

The matrices $M(k+1|k+1)$ and $D(k+1|k+1)$ are calculated as $$M(k+1|k+1) = LM(k+1|k)L' + KNK' \quad (35)$$

and $$D(k+1|k+1) = LD(k+1|k) \quad (36)$$

respectively. Finally, the matrix of the total covariance is calculated as $$S(k+1|k+1) = M(k+1|k+1) + D(k+1|k+1)\Lambda D(k+1|k+1)' \qquad (37)$$

and equation (37) represents a mean-square criterion which may be used for a root-mean-square determination. The above equations (25)–(37) are set forth in FIG. 3 and in P. Mookerjee and F. Reifler, "Reduced State Estimator for Systems with Parametric Inputs," *IEEE Transactions on Aerospace and Electronic Systems*, pp. 446–461, Vol. AES-40, No. 2, April 2004.

The calculations associated with block 326 of FIG. 3 separates the state estimation error covariance S(j|k) into components, M(j|k) and D(j|k)ΛD(j|k), attributable to measurement error and parameter uncertainty, and separately propagates these covariances from one time index k to next time index k+1. In addition, the gain matrix K are computed based on these propagated covariances. The gains weight the measurements to form the state estimates. The values of these gains so computed are, of course, different from those computed by the prior art method of FIG. 2.

A salient difference between the prior-art method and that of the invention is the introduction into the equations defining a multidimensional state estimation error covariance denoted above as M(j|k), attributable to measurement error and D(j|k)ΛD(j|k), representing the physical bounds of the parameters, and propagating certain coefficients (denoted as D(k|k) and D(k+1|k)) rather than the parameter itself, as described in the article by Portmann, Moore, and Bath 1990. As mentioned, that parameter cannot be propagated in more than one dimension. The matrix M(j|k) is defined as the covariance of the state estimation errors at time $t_j$ due only to the errors in the measurements z(i) for $1 \leq i \leq k$ and a priori initial information that is independent of the parameter uncertainty. D(j|k) is defined as the matrix of bias coefficients, which linearly relates state estimation errors to the parameter errors, at time $t_j$ (after processing k=0, 1, 2, . . . measurements).

Thus, the invention uses a novel mean-square optimization criterion (equation (37)) which explicitly addresses the known physical bounds of the multidimensional parameters, and incorporates analytical modeling of the parameter bounds, whose modeling may be as precise as knowledge of the boundary values permits. The invention provides an exact implementable recursive solution that optimizes the mean-square criterion. The solution according to this aspect of the invention is both consistent and optimal for the criterion. As mentioned above, consistency and optimality were lacking in the prior art, leading to the paradox in which more data gave worse performance (W. D. Blair and Y. Bar-Shalom, "Tracking Maneuvering Targets with Multiple Sensors: Does More Data Always Mean Better Estimates?" *IEEE Transactions on Aerospace and Electronic Systems*, pp. 450–456, Vol. AES-32, No. 1, January 1996 and J. R. Moore and W. D. Blair, "Practical Aspects of Multisensor Tracking," in *Multitarget-Multisensor Tracking: Applications and Advances*, Volume III, Y. Bar-Shalom and William Dale Blair, (ed.) Boston, Mass.: Artech House, 2000, pp. 43–44).

The solution described above applies to very general linear and nonlinear systems. In general, there are five broad classes of systems to which Kalman filters apply:

(a) Linear systems with unknown constant parameters as inputs;
(b) linear systems with white noise as inputs;
(c) linear systems with time-varying parameters with known bounds as inputs;
(d) linear systems whose system matrices depend on unknown constant parameters; and
(e) nonlinear systems that depend on time-varying parameters with known bounds.

Among these, systems (a), (b), and (d) are capable of being correctly handled by the prior-art filter estimation methods. General systems of types (c) and (e), however, cannot be handled by the prior-art methods. More specifically, the prior art does not address any system of type (e) and the paper by Portmann, Moore, and Bath 1990 addresses only one special case of type (c) for a single parameter. Thus, the invention provides a general solution for types (a), (b), (c), (d), and (e), although it may find greatest use in general systems of types (c) and (e). Most systems with uncontrollable (independently variable) but bounded parameters fall into types (c) and (e), such as encountered in tracking maneuvering aircraft, controlling nuclear, chemical, or manufacturing factories, attitude control of a space station, traction control of an automobile subject to weather conditions, etc.

The current invention is different from the prior art in at least that it uses the matrix Λ to explicitly include the physical bounds on the uncertain parameters, it separates the state estimation error covariance S(j|k) into components, M(j|k) and D(j|k)ΛD(j|k), attributable to measurement error and parameter uncertainty, respectively, and separately propagates these covariances from one time index k to next time index k+1; and, based on these propagated covariances, the gain matrix K are computed that weight the measurements to form the state estimates. The values of these gains so computed are different from the prior art and provide solutions where none could be found before.

What is claimed is:

1. A method for estimating the state of a system having multidimensional parameters, which parameters have known bounded values, said method comprising the following steps:
   measuring aspects of the state of the system to produce measurements, and initializing state estimates $\hat{x}(k_0|k_0)$ and the matrices $M(k_0|k_0)$, $D(k_0|k_0)$;
where
   matrix M(j|k) is defined as the covariance of the state estimation errors at time $t_j$ due only to the errors in the measurements z(i) for $1 \leq i \leq k$ and a priori initial information that is independent of the parameter uncertainty; and
   matrix D(j|k) is defined as the matrix of bias coefficients, which linearly relates state estimation errors to the parameter errors, at time $t_j$ (after processing k=0, 1, 2, . . . measurements);
   determining the system transition matrices Φ, Γ, and the mean value $\bar{\lambda}$ of unknown but bounded parameters λ;
   determining F, G using $$F = \Phi + \Gamma \frac{\partial u}{\partial x}\bigg|_{x=\hat{x}(k|k), \lambda=\bar{\lambda}} \qquad (38)$$

$$G = \Gamma \frac{\partial u}{\partial \lambda}\bigg|_{x=\hat{x}(k|k), \lambda=\bar{\lambda}} \qquad (39)$$

generating a parameter matrix Λ, representing physical bounds on those parameters that are not state variables of the system;

extrapolating said state estimates $\hat{x}(k|k)$ and matrices $M(k|k)$, $D(k|k)$, $S(k|k)$ to $\hat{x}(k+1|k)$, $M(k+1|k)$, $D(k+1|k)$, and $S(k+1|k)$ as in $$\hat{x}(k+1|k)=\Phi\hat{x}(k|k)+\Gamma u(\hat{x}(k|k),\bar{\lambda}) \quad (40)$$

$$M(k+1|k)=FM(k|k)F' \quad (41)$$

$$D(k+1|k)=FD(k|k)+G \quad (42)$$

$$S(k+1|k)=M(k+1|k)+D(k+1|k)\Lambda D(k+1|k)' \quad (43)$$

determining the noise covariance N;
determining covariance of the residual Q as in $$Q=HS(k+1|k)H'+N \quad (44)$$

determining the filter gain matrix K as in $$K=S(k+1|k)H'Q^{-1} \quad (45)$$

determining the matrix L as in $$L=I-KH \quad (46)$$

where I is the identity matrix;
measuring at least one aspect $z(k+1)$ of the state of the system;
updating the state estimate $\hat{x}(k+1|k)$ as $$\hat{x}(k+1|k+1)=\hat{x}(k+1|k)+K[z(k+1)-H\hat{x}(k+1|k)] \quad (47)$$

updating the matrices $M(k+1|k)$ and $D(k+1|k)$ as $$M(k+1|k+1)=LM(k+1|k)L'+KNK' \quad (48)$$

$$D(k+1|k+1)=LD(k+1|k) \quad (49)$$

respectively, and generating the total mean square error $S(k+1|k+1)$ as in $$S(k+1|k+1)=M(k+1|k+1)+D(k+1|k+1)\Lambda D(k+1|k+1)' \quad (50).$$

2. A method for estimating the state of a system comprising the steps of:

observing a system having state variables and also having unknown, multidimensional, arbitrarily time-varying parameters, but which are subject to known bounded values;

measuring certain aspects of the state of the system in the presence of measurement errors to produce measurements;

applying the measurements to an estimating filter that explicitly uses a mean square optimization criterion that separately accounts for measurement errors and said bounding values, to produce estimates of the true state of the system;

applying said estimates to one of (a) make a decision relating to said system, (b) operate a control system, and (c) control a process.

* * * * *